Dec. 11, 1956        H. C. OPPEL        2,773,343
COOPERATING ROTATABLE DISK TYPE BEET HARVESTER
Filed Oct. 10, 1952        4 Sheets-Sheet 1
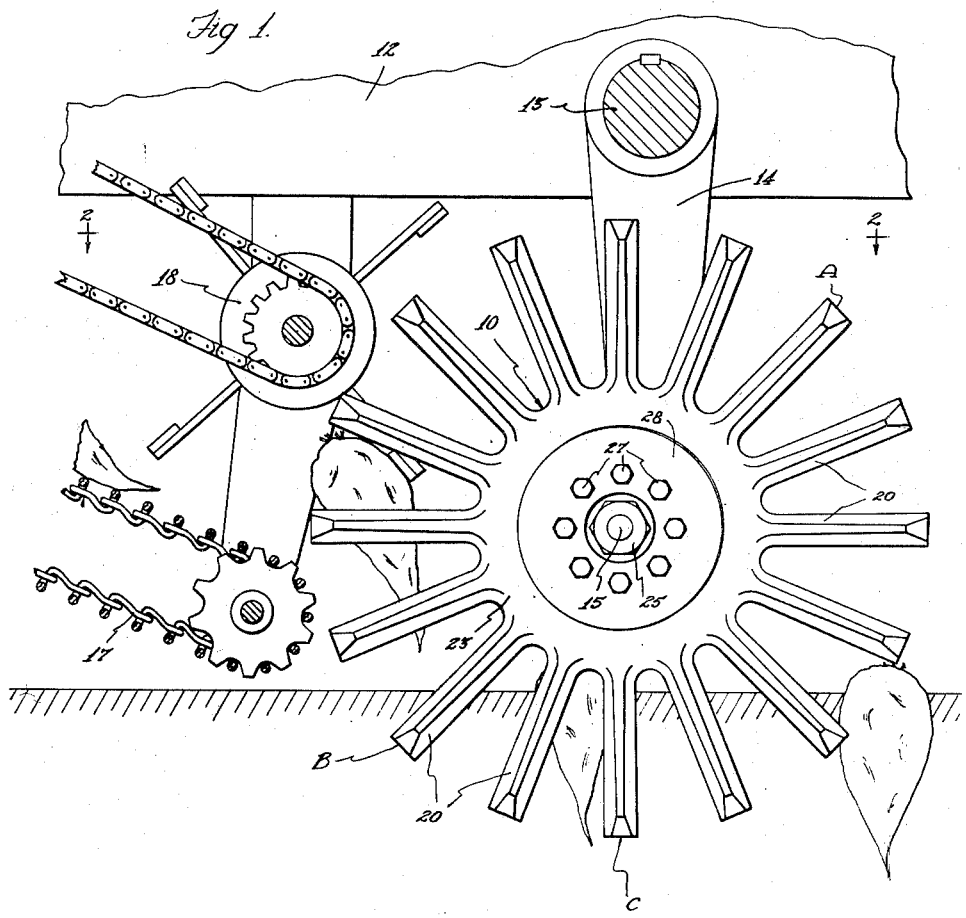
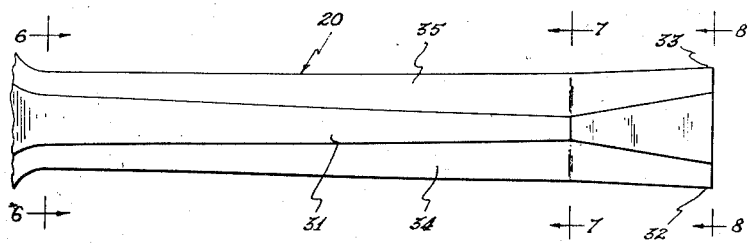
INVENTOR.
Heinz Carl Oppel Dec. 11, 1956  H. C. OPPEL  2,773,343
COOPERATING ROTATABLE DISK TYPE BEET HARVESTER
Filed Oct. 10, 1952  4 Sheets-Sheet 2

INVENTOR.
Heinz Carl Oppel
BY
Atty.

Dec. 11, 1956 H. C. OPPEL 2,773,343
COOPERATING ROTATABLE DISK TYPE BEET HARVESTER
Filed Oct. 10, 1952 4 Sheets-Sheet 3

INVENTOR.
Heinz Carl Oppel
BY
Fred Wells
Atty.

Dec. 11, 1956 H. C. OPPEL 2,773,343
COOPERATING ROTATABLE DISK TYPE BEET HARVESTER
Filed Oct. 10, 1952 4 Sheets-Sheet 4

INVENTOR.
Heinz Carl Oppel
BY
Atty.

United States Patent Office 2,773,343
Patented Dec. 11, 1956

2,773,343

COOPERATING ROTATABLE DISK TYPE BEET HARVESTER

Heinz Carl Oppel, Boise, Idaho

Application October 10, 1952, Serial No. 314,145

3 Claims. (Cl. 55—108)

My invention relates to improvements in a harvester for beets and similar root crops.

It is the principal purpose of my invention to provide an improved mechanism for lifting beets and similar root crops from the ground, utilizing two opposed toothed wheels which are disposed at suitable angles to the vertical and to the direction of advance to cause the teeth entering the soil to gradually close upon the root, the teeth of the opposed wheels reaching their minimum spacing from each other at a point somewhat behind a vertical plane through their axes of rotation so that the teeth exert a lifting and squeezing action to raise the root out of its normal resting position. The improvements in this type of mechanism are in the toothed formation of the wheels whereby they are better able to shed the soil and in the mounting of the wheels whereby they are able to yield sufficiently to clear rocks that may be caught between two opposing teeth.

Heretofore toothed wheels arranged in the fashion referred to above have been used to lift beets onto a receiving conveyor, however, these devices have presented the difficulty that they clog readily from wet soil. The teeth have also been difficult to maintain because of the nature of the digging and lifting operation. Since the two wheels in opposed relation have their peripheral edges closest to each other at some distance behind and above the point of maximum penetration in the soil, they readily pick up rocks or other hard objects in the soil. The roots of the beets increase in diameter upwardly so that they tend to rise and slip as the teeth close toward each other. However, if a rock gets caught between the teeth somewhat in advance of where they are closest to each other, the unyielding rock will cause the teeth to break or bend. The bent teeth, of course, are no longer effective and if a tooth is broken out, it may result in leaving a root in the soil.

It is a specific purpose of my invention to provide opposed digging wheels which are made in one piece, that is, the teeth and the mounting portion of each wheel comprises one solid unit that may be cast. This unit is attached to a driving hub in such a fashion as to be yieldingly held in a plane perpendicular to the hub axis, a spring plate allowing the unitary wheel to rock slightly with respect to the hub in order to relieve the strain when a rock is caught between two wheels.

It is also an object of my invention to provide a toothed wheel for use in lifting the beet roots from the soil wherein the teeth are particularly shaped and formed to cause them to shed the soil readily, the construction being such that each tooth individually has a substantially increased depth toward the center of the wheel than at the tip of the tooth, the tooth also being substantially greater in depth than the mounting portion of the wheel in order to approach the over all strength of the mounting portion in each individual tooth.

The nature and advantages of my invention will be more apparent from the following description and the accompanying drawings illustrating a preferred form thereof. The drawings and description are illustrative only, however, and are not intended to limit the invention except insofar as it is limited by the claims.

In the drawings:

Figure 1 is a vertical section view taken on a line at one side of a pair of toothed digging wheels in a beet harvester;

Figure 5 is an enlarged outer face view of one of the teeth of a wheel;

Figure 2:
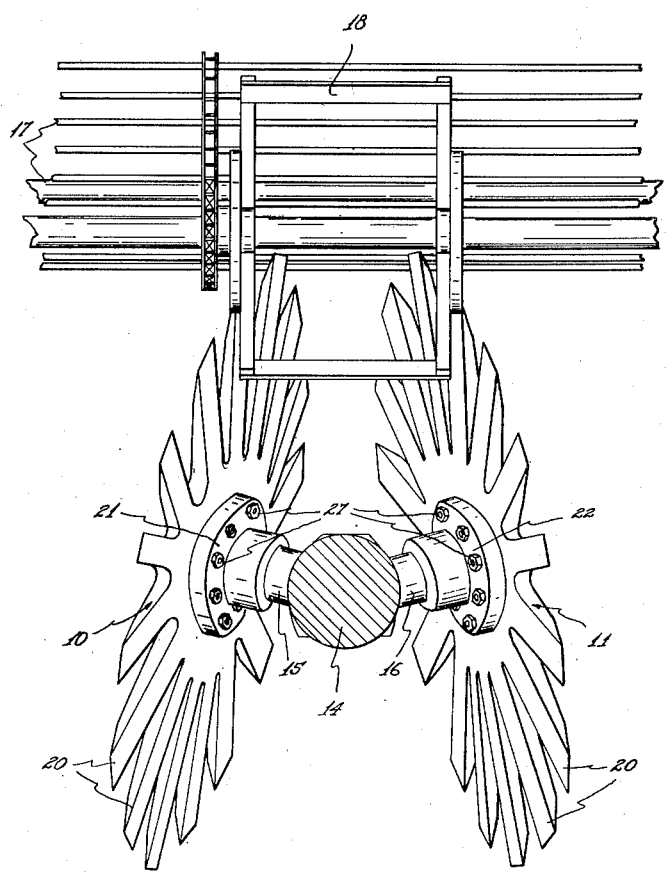
Figure 2 is a plan sectional view taken substantially on the line 2—2 of Figure 1.
Figure 3:
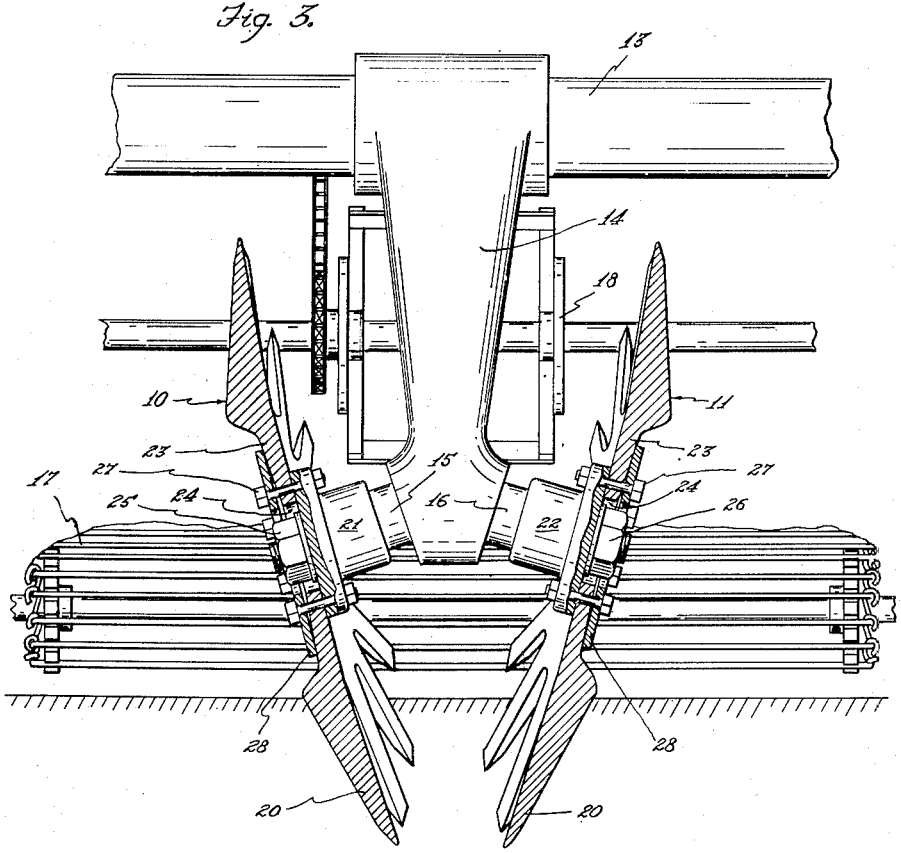
Figure 3 is a front view with the digging wheels broken away on a line at their centers.
Figure 6:
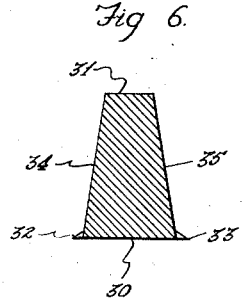
Figure 6 is a sectional view on the line 6—6 of Figure 5.
Figure 7:
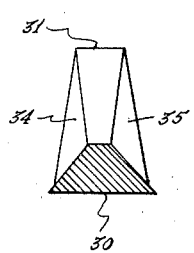
Figure 7 is a sectional view on the line 7—7 of Figure 5.
Figure 8:
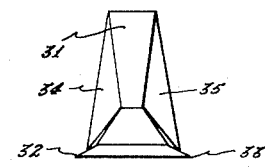
Figure 8 is an end view looking at Figure 5 on the line 8—8.

Referring now in detail to the drawings, my invention is embodied in a harvester for sugar beets and similar root crops, wherein pairs of digging wheels 10 and 11 are mounted on a suitable framework 12 by a suitable bearing 13 and a standard 14. The standard 14 has shafts 15 and 16 that carry the wheels 10 and 11. Rearwardly of the wheels 10 and 11, a conveyor 17 is suspended from the frame 12 so as to carry away the roots dug by the wheels 10 and 11. A paddle wheel 18 is mounted above and forwardly of the conveyor 17 to work between the wheels 10 and 11 and aid in sweeping the lifted roots onto the conveyor 17. The details of the paddle wheel 18 and the conveyor 17 are of no importance to the present invention. Devices of this character are known and now used for this purpose. My invention is directed to improvements in the wheels 10 and 11 and their mounting upon the shafts 15 and 16.

In machines of this general character with which I am familiar, the digging wheels such as 10 and 11 have been made with separable individual teeth. The shafts 15 and 16 are set at such an angle that a maximum separation of the wheels 10 and 11 occurs at the point A in Figure 1, and the peripheries of the wheels 10 and 11 are the closest to each other at the point B in Figure 1. This arrangement of the wheels is necessary in order to have them perform their digging function. The teeth 20 of the wheels are forced down into the soil as the machine is moved forward so that the wheels rotate on the shafts 15 and 16 because of their resistance of the soil to their forward movement. The opposed teeth 20 reach their maximum depth at the point C in Figure 1, and are already gradually closed toward each other so that as they rise out of the ground, they will lift a beet root that is caught between them. The soil that is caught with the beet root will be crushed away and will pass between the teeth 20. The root itself is yielding and if pressure is applied it is slippery so that it will rise along the teeth after it is squeezed between two opposed teeth. However, if a non-compressible object such as a rock is caught between the tips of two teeth, then either the teeth must bend or break, or the whole assembly must be shoved forward without rotating the wheels. In the past this difficulty has resulted in a serious maintenance problem because the teeth are either bent or the wheel is broken.

According to my invention I provide hubs 21 and 22 on the shafts 15 and 16 with suitable bearings so that they will turn free on the shafts. Each wheel 10 or 11 and each tooth 20 is made up of a single cast unit, the teeth being integral with the central portion 23 of the wheel.

An aperture 24 is provided at the center of each wheel so as to provide clearance for nuts 25 and 26 that hold the hubs 21 and 22 on the shafts 15 and 16. The wheel portions 23 are provided with bolt holes to receive bolts 27, and a spring plate 28 is provided outside each wheel. The bolts 27 pass through the spring plate 28, the portion 23 of the wheel and through the hub flanges.

Figure 4:
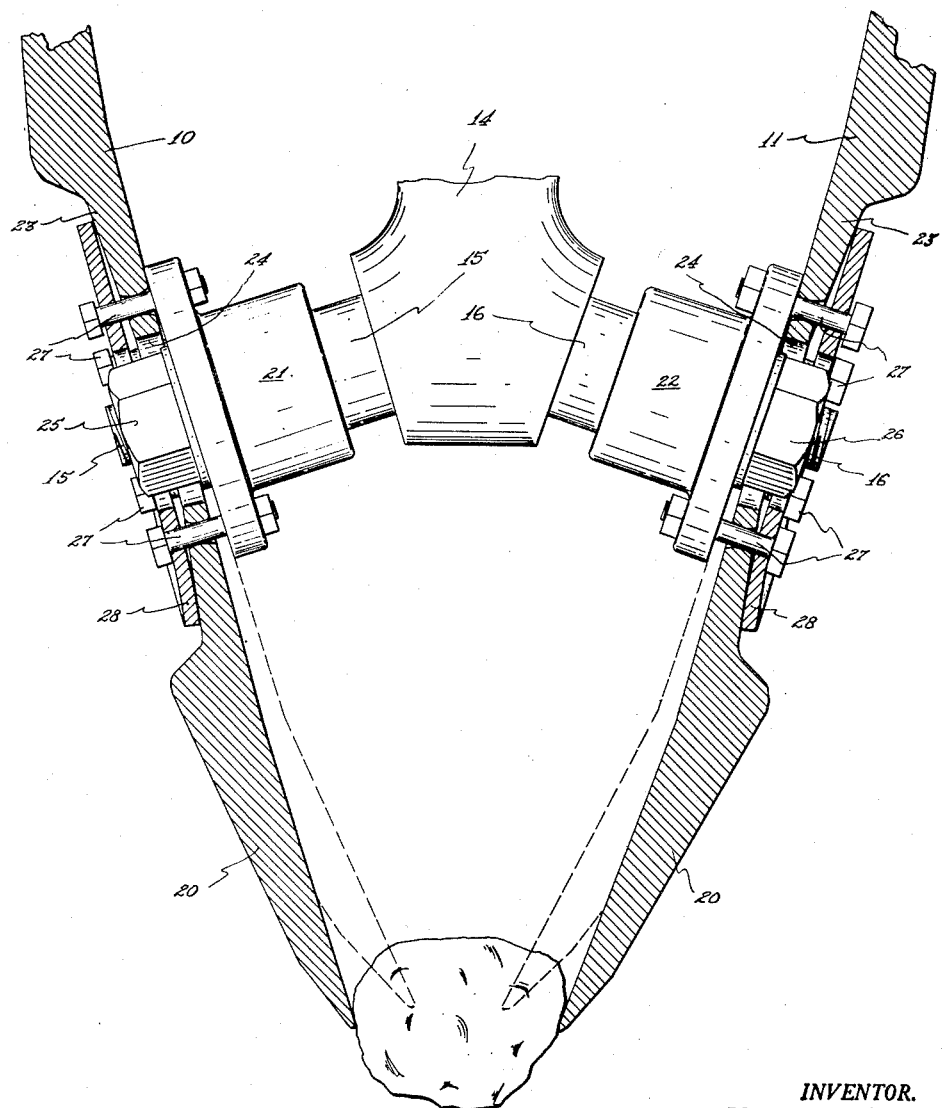
Figure 4 is an enlarged fragmentary view showing the wheels as they spread to relieve the tension caused by a rock caught between two of the teeth.

In order to provide a yielding mounting for the wheels, the outer surface of the portion 23 is bevelled slightly so that the portion 23 is somewhat thinner at the opening 24 than it is at the base of the teeth 20. The spring plate 28 is large enough to substantially cover the portion 23. In its unstressed state, the spring plate 28 is flat. The bolts 27 apply tension too so that it yieldingly clamps the portion 23 in place. The rotating force, of course, is a shear force on the bolts 27 and they are made to withstand this shear force. When a rock is caught between two of the teeth 20 before they reach the position B, this rock will keep the teeth from closing any closer together. The spring plate can bend as illustrated in Figure 4 so as to allow the wheels to rock about the opposite edges of the flanges on the hubs 21 and 22. In this way a sufficient yield is provided to permit the teeth to carry the rock until they again spread apart enough to release it.

If the soil happens to be wet when the beets are being dug, the teeth 20 must be able to shed the soil. Furthermore, the construction should be such as to avoid the wedging of rocks between two adjacent teeth on the same wheel. In addition, each individual tooth must be capable of withstanding a heavy strain sufficient to deform the spring plate 28. To obtain a tooth capable of fulfilling these requirements, I have constructed the teeth 20 of the wheels 10 and 11 as illustrated best in Figures 5 to 8 inclusive. As shown by these figures the inner faces 30 of the teeth are substantially flat and are substantially wider than the outer faces 31. At the outer tip, each tooth is widened as indicated at 32 and 33, to provide relatively sharp penetrating edges for first engaging the soil. These sharp edges will tend to cut trash on the top of the soil and to remove rocks or other obstructions out of the way. From the outer tip portions 32 and 33, the teeth become narrower circumferentially of the wheel and thicker in a direction perpendicular to the wheel so that the maximum thickness of each tooth is greatest at its base. The wide faces 34 and 35 of the tooth converge toward the back or outer face 31 of the tooth, the angle of the approach being increased from the base of the tooth to the tip so that the tooth readily sheds any soil that is squeezed between the teeth.

It is believed that the nature and advantages of my invention will be apparent from the foregoing description. Having thus described my invention, I claim:

1. In a harvester for beets and like crops having a frame, a standard carried thereby, a pair of generally laterally, outwardly and downwardly extending axles fixed in generally opposed relation to the lower end of the standard, a wheel hub rotatably mounted on each axle, a one piece wheel casting secured to each hub, the wheel castings each comprising a central mounting portion, and a multiplicity of teeth extending radially outward from said portion, the teeth being trapezoidally shaped in cross section with wide flat faces facing toward the opposing wheel and narrowing in width to their outer faces.

2. The invention set forth in claim 1, further characterized by the casting being substantially thicker than the width of the teeth at the junction of the teeth with the central portion and decreasing in thickness inwardly and outwardly from said junction.

3. The invention set forth in claim 1, further characterized by the teeth having sharp cutting edges at their outer ends and increasing in thickness to their junction with the central portion and the casting decreasing abruptly in thickness inwardly of the junction, providing a flat circular central mounting portion.

References Cited in the file of this patent

UNITED STATES PATENTS

| | | |
|---|---|---|
| 977,367 | Brennan | Nov. 29, 1910 |
| 1,114,390 | Serres | Oct. 20, 1914 |
| 1,620,019 | Hammer et al. | Mar. 8, 1927 |
| 2,682,739 | Bozeman et al. | July 6, 1954 |

FOREIGN PATENTS

| | | |
|---|---|---|
| 261,878 | Great Britain | Dec. 2, 1926 |